(12) United States Patent
Larsen et al.

(10) Patent No.: US 9,318,988 B2
(45) Date of Patent: Apr. 19, 2016

(54) SYSTEM AND METHOD FOR VOLTAGE CONTROL OF WIND GENERATORS

(71) Applicant: General Electric Company, Schenectady, NY (US)

(72) Inventors: Einar Vaughn Larsen, Ballston Lake, NY (US); Alfredo Sebastian Achilles, Buenos Aires (AR)

(73) Assignee: General Electric Company, Schenectady, NY (US)

(*) Notice: Subject to any disclaimer, the term of this patent is extended or adjusted under 35 U.S.C. 154(b) by 100 days.

(21) Appl. No.: 14/018,482

(22) Filed: Sep. 5, 2013

(65) Prior Publication Data

US 2015/0061290 A1  Mar. 5, 2015

(51) Int. Cl.
| | |
|---|---|
| *H02P 9/04* | (2006.01) |
| *F03D 7/00* | (2006.01) |
| *F03D 9/00* | (2006.01) |
| *H02J 3/38* | (2006.01) |
| *H02J 3/16* | (2006.01) |
| *F03D 7/02* | (2006.01) |
| *F03D 7/04* | (2006.01) |
| *H02P 9/00* | (2006.01) |

(52) U.S. Cl.
CPC .. *H02P 9/04* (2013.01); *F03D 7/00* (2013.01); *F03D 7/0284* (2013.01); *F03D 7/048* (2013.01); *F03D 9/005* (2013.01); *H02J 3/16* (2013.01); *H02J 3/386* (2013.01); *F05B 2270/1033* (2013.01); *H02P 2009/004* (2013.01)

(58) Field of Classification Search
CPC ........... F03D 7/00; F03D 9/005; F03D 7/048; Y02E 10/723; Y02E 10/725; Y02E 10/763; H02J 3/386; H02J 3/18

USPC .............................. 290/44, 55; 700/286–290
See application file for complete search history.

(56) References Cited

U.S. PATENT DOCUMENTS

| | | | |
|---|---|---|---|
| 7,119,452 B2 | 10/2006 | Larsen | |
| 7,166,928 B2 | 1/2007 | Larsen | |
| 7,224,081 B2 | 5/2007 | Larsen | |
| 7,983,799 B2 * | 7/2011 | Bose et al. | 700/297 |
| 2005/0046196 A1* | 3/2005 | Larsen | 290/44 |
| 2009/0218817 A1* | 9/2009 | Cardinal et al. | 290/44 |

(Continued)

FOREIGN PATENT DOCUMENTS

| | | |
|---|---|---|
| DE | 102011112025 A1 | 2/2013 |
| DK | WO 2012028150 A2 * | 3/2012 |

OTHER PUBLICATIONS

Ledesma et al., "Contribution of variable-speed wind turbines to voltage control", Wind Engineering. Multi-Science Publishing Co., vol. No. 26, Issue No. 6, pp. 347-358, Nov. 30, 2002.

(Continued)

*Primary Examiner* — Tulsidas C Patel
*Assistant Examiner* — Viet Nguyen
(74) *Attorney, Agent, or Firm* — Dority & Manning, P.A.

(57) ABSTRACT

A system and associated method for reactive power generation for a wind turbine generator includes receiving a higher-than-generator level voltage command signal. A reactive current is determined for the wind turbine generator in response to the voltage command signal and is transmitted to a controller of the wind turbine generator for generating a real and reactive power based on the reactive current command. A trim value may be generated and applied to the voltage command signal.

14 Claims, 5 Drawing Sheets

(56) References Cited

U.S. PATENT DOCUMENTS

| | | | |
|---|---|---|---|
| 2010/0025994 A1* | 2/2010 | Cardinal et al. | 290/44 |
| 2010/0308585 A1* | 12/2010 | Jorgensen et al. | 290/44 |
| 2011/0156389 A1* | 6/2011 | Arlaban Gabeiras et al. | 290/44 |
| 2012/0038156 A1* | 2/2012 | Hehenberger | 290/44 |
| 2012/0101640 A1* | 4/2012 | Stapelfeldt | 700/287 |
| 2013/0168963 A1* | 7/2013 | Garcia | 290/44 |
| 2013/0187383 A1* | 7/2013 | Esbensen et al. | 290/44 |
| 2014/0035284 A1* | 2/2014 | Bech | 290/44 |
| 2014/0062085 A1* | 3/2014 | Larsen | F03D 9/005 290/44 |
| 2015/0061289 A1* | 3/2015 | Larsen | F03D 7/00 290/44 |

OTHER PUBLICATIONS

European Search Report and Written Opinion issued in connection with corresponding EP Application No. 14181594.4 dated Jan. 29, 2015.

* cited by examiner

SYSTEM AND METHOD FOR VOLTAGE CONTROL OF WIND GENERATORS

FIELD OF THE INVENTION

The present invention relates generally to the field of wind turbines, and more particularly to voltage control systems and techniques for use with wind turbine generators having continuous control of reactive power for at least part of the reactive power compensation function.

BACKGROUND OF THE INVENTION

Wind power generation is typically provided by a wind "farm" of a large number (often 100 or more) wind turbine generators. Individual wind turbine generators can provide important benefits to power system operation related to mitigation of voltage flicker caused by wind gusts and mitigation of voltage deviations caused by external events.

In a wind farm setting, each wind turbine generator can experience a unique wind force. Therefore, each wind turbine generator typically includes a local controller to control the response to wind gusts and other external events. Prior art wind farm control has generally been based on one of two architectures: local control with constant power factor or reactive power and farm-level control in voltage control, or local control in constant voltage control with no farm-level control.

Local control with constant power factor and farm-level control in voltage control requires fast communications with aggressive action from the farm-level to the local level. If the farm-level control is inactive the local control can aggravate voltage flicker. With constant voltage control on each generator, steady-state operation varies significantly with small deviations in loading on the transmission grid. This causes the wind turbine generators to encounter limits in steady-state operation that prevent a response to disturbances—resulting in a loss of voltage regulation. Because reactive current is higher than necessary during this mode of operation, overall efficiency of the wind turbine generator decreases.

U.S. Pat. No. 7,224,081 describes a voltage control method and system for wind turbines wherein a reactive power regulator controls reactive power production of individual wind turbines in a wind farm by adjusting the voltage setpoint to a voltage regulator. This scheme relies on receipt of a reactive power command to each wind turbine generator. At the individual wind turbine level, a fast voltage regulator holds the wind turbine low-voltage side to a setpoint, which is adjusted by the reactive power regulator to follow the command from the wind farm control. The reactive power regulator has a first time constant that is numerically greater than a time constant of the voltage regulator. This control scheme is beneficial in that it forces all wind turbines within the wind farm to have the same reactive power output. Also, if the wind farm-level control is off, then the wind turbines all stay at a preset reactive power output even if the grid voltage varies. A downside to this scheme, however, is that the wind farm controller must act through the time constant of the reactive power regulator.

BRIEF DESCRIPTION OF THE INVENTION

Aspects and advantages of the invention will be set forth in part in the following description, or may be obvious from the description, or may be learned through practice of the invention.

A particular method embodiment for reactive power generation for a wind turbine generator includes receiving a voltage command signal from a higher-than-generator-level, such as a wind farm or substation, controller. In this description, the term "field-level" is generically meant to include all such higher-than-generator-level configurations, such as a substation of multiple wind turbines, a wind farm of multiple substations or multiple wind turbines, and so forth. A reactive current command is generated for the wind turbine generator in response to the voltage command signal. The reactive current command is transmitted to a converter controller of the wind turbine generator for generating a reactive power based on the reactive current command.

In the embodiments described herein, the voltage command signal is a wind farm-level command signal that is applied to all or a subset of wind turbines within a wind farm.

In a particular embodiment, the voltage command signal is limited to a range of upper and lower limits based on generator terminal voltage, and the reactive current command is limited to a range based on a current rating of the wind turbine generator.

Generation of the reactive current command with the voltage command signal may be achieved in various ways. For example, in one embodiment, the voltage command signal is compared to a measured terminal voltage of the wind turbine generator to generate an error voltage signal transmitted to a voltage regulator.

The voltage command signal may be adjusted prior to generation of the reactive current command. In one embodiment, the voltage command signal is adjusted as a function of a local reactive power droop characteristic for the wind turbine generator. The droop characteristic is preset, and may vary between the different wind turbine generators within a wind farm. With this embodiment, a voltage trim signal may be generated as a function of the reactive power droop characteristic and a measured reactive power feedback signal from the wind turbine generator, with the voltage trim signal applied to the voltage command signal to generate an adjusted voltage command signal. This adjusted signal can then be compared to measured terminal voltage to generate a voltage error signal that is used to generate the reactive current command.

In another embodiment, the voltage command signal is adjusted as a function of a real power offset value that is assigned to the wind turbine based upon, for example, location of the wind turbine within a wind farm. The real power offset value can be preset and, as mentioned, may vary between the different wind turbine generators based on respective location within a wind farm. With this embodiment, a voltage trim signal may be generated as a function of the real power offset value and a measured real power feedback signal from the wind turbine generator, with the voltage trim signal applied to the voltage command signal to generate an adjusted voltage command signal. This adjusted signal can then be compared to measured terminal voltage to generate a voltage error signal that is used to generate the reactive current command.

In still a further embodiment, the voltage command signal may be adjusted as a combined function of a local reactive power droop characteristic and real power offset value for the wind turbine generator. Either or both of the droop characteristic and real power offset value may vary between different wind turbine generators within the wind farm. A voltage trim signal is generated as a function of the combination of the reactive power droop characteristic applied to a measured reactive power feedback signal for the wind turbine generator, and the real power offset value applied to a measured real power feedback signal for the wind turbine generator. The voltage trim signal is applied to the voltage command signal to generate an adjusted voltage command signal. This adjusted signal can then be compared to measured terminal voltage to generate a voltage error signal that is used to generate the reactive current command.

The field-level controller may be variously configured. In certain embodiments, the field-level controller includes a voltage regulator with inputs of (a) plant level voltage and (b) reactive and real power output from the individual turbines, and an output of a farm-level voltage command.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended figures, in which.

DETAILED DESCRIPTION OF THE INVENTION

Figure 1:
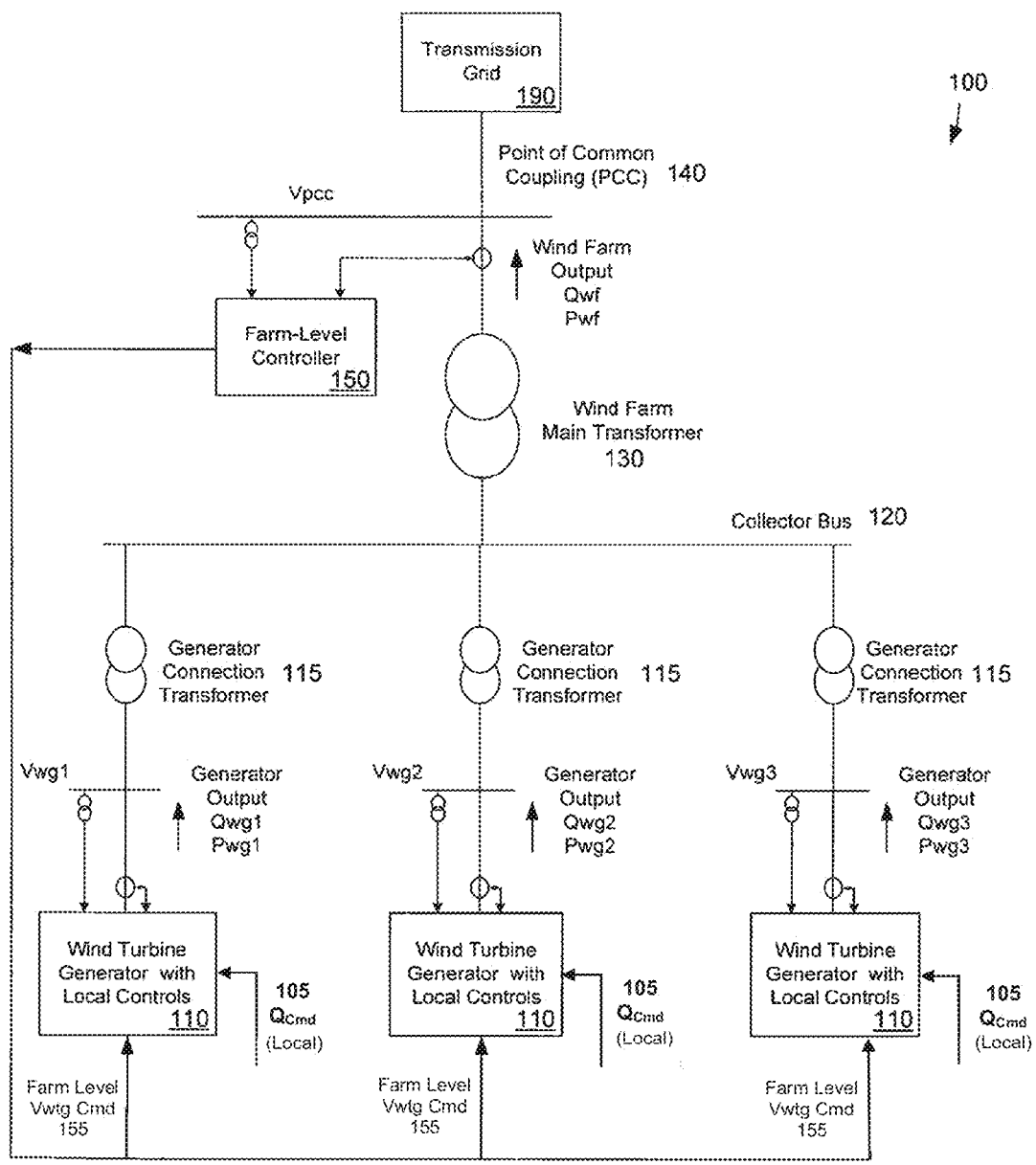
FIG. 1 is a block diagram of a wind farm having multiple wind turbine generators coupled with a transmission grid.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

A wind turbine generator control system in accordance with aspects of the invention is based on sending a reference voltage command to all of the wind turbines within a wind farm or substation rather than a reactive power command, as is done in the prior art. For grids requiring stabilization, this control scheme is advantageous since the voltage reference modification affects wind turbine operation faster. The reference voltage control scheme is implemented with relatively fast regulation of voltage for individual generators at the generator terminals or at a synthesized remote point (e.g., between the generator terminals and the collector bus). A voltage bias or trim signal may be generated (as described in greater detail below) and applied to the reference voltage command to adjust the voltage setpoint of a relatively fast voltage regulator that generates the reactive current command for the turbine generator.

It should be appreciated that the reference voltage command signal may be generated by any field-level (higher-than-generator-level) controller, such as a substation controller or a farm-level controller. For description purposes, embodiments are described herein with respect to a wind farm wherein a plurality of wind turbines are in communication with a wind farm-level controller.

FIG. 1 is a block diagram of a wind farm 100 having multiple wind turbine generators coupled with a transmission grid. FIG. 1 illustrates only three wind generators; however, any number of wind generators can be included in a wind farm.

Each wind turbine generator 110 includes a local controller that is responsive to the conditions of the wind turbine generator being controlled. In one embodiment, the controller for each wind turbine generator senses only the terminal voltage and current (via potential and current transformers). The sensed voltage and current are used by the local controller to provide an appropriate response to cause the wind turbine generator to provide the desired reactive power and voltage. A control system diagram corresponding to one embodiment of a wind turbine generator controller is described in greater detail below with respect to FIG. 2.

Each wind turbine generator 110 is coupled to collector bus 120 through generator connection transformers 115 to provide real and reactive power (labeled $P_{wg}$ and $Q_{wg}$, respectively) to collector bus 120. Generator connection transformers and collector buses are known in the art.

Wind farm 100 provides real and reactive power output (labeled $P_{wf}$ and $Q_{wf}$, respectively) via wind farm main transformer 130. Farm-level controller 150 senses the wind farm output, as well as the voltage at the point of common coupling (PCC) 140, to provide a farm-level wind generator terminal voltage command (Farm-Level $V_{wtg\ Cmd}$) 155. In one embodiment, the farm-level controller 150 provides a single $V_{wtg\ Cmd}$ signal 155 to all wind turbine generators in the wind farm 100. In alternate embodiments, the farm-level controller 150 may provide multiple commands for subsets of wind turbine generators of the wind farm 100. The commands to subsets of wind turbine generators can be based on, for example, a farm-level voltage regulator.

Still referring to FIG. 1, the local controller of each wind turbine generator 110 may also be provided with a Q command signal 105 ($Q_{Cmd}$) generated at the local or operator level, for example in the event that the wind turbine generator is in manual mode or otherwise not in communication with the wind farm controller 150, as explained in greater detail below.

Figure 2:
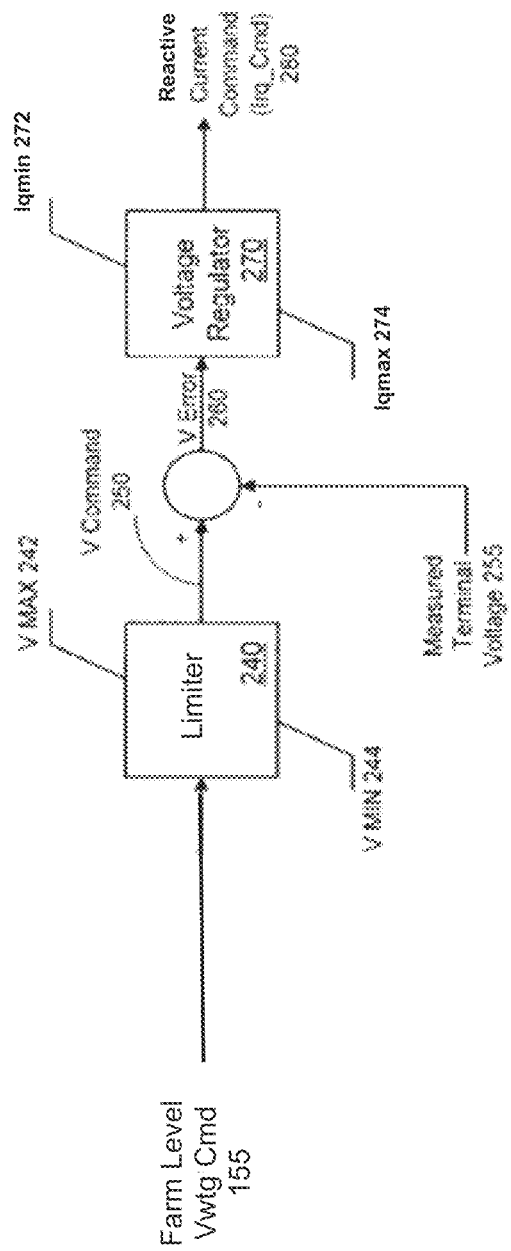
FIG. 2 is a control diagram of one embodiment of a wind turbine generator control system.

The control system of FIG. 2 provides an improved control structure involving both turbine and farm-level control that can perform a robust farm-level voltage control performance with uniform reactive power output of the wind turbines.

Referring to the wind turbine control system diagram of the embodiment of FIG. 2, the control system generally includes a voltage regulator loop that operates relatively fast (e.g., 20 rad/sec). The set point of the voltage regulator may be adjusted, as described below. A requirement with this control system is to maintain a reasonable balance of reactive power from all of the wind turbine generators within the wind farm. For most applications, this may be accomplished with the system of FIG. 2 by relying essentially solely on the impedances of the respective wind turbine transformers 115 (FIG. 1). For applications wherein collector impedance introduces significant imbalances in current flow for different wind turbine generators, for example as with a long feeder with many wind turbines, then a bias or trim function can be applied, as discussed below with reference to FIGS. 3 through 5.

Conceptually, the control system of FIG. 2 provides for wind turbine generator terminal voltage control by regulating the voltage according to a reference set by a higher-than-generator-level (e.g., substation or wind farm) controller. In the present case, this higher reference is the farm-level $V_{wtg\ Cmd}$ signal 155. Wind turbine generator terminal voltage is regulated over a shorter term (e.g., less than several seconds) to mitigate the effects of fast grid transients.

The farm-level voltage command signal $V_{wtg\ Cmd}$ 155 is transmitted to a limiter circuit 240, which serves to maintain the signal value within defined limits and generate a set point voltage command signal $V_{command}$ 250 that indicates to a generator the reactive power to be provided by the generator. $V_{command}$ 250 is limited by limiter 240 to a predetermined range between $V_{max}$ 242 and $V_{min}$ 244. These values of $V_{max}$ 242 and $V_{min}$ 244 may be defined in terms of percentage of rated generator output. For example, $V_{max}$ 242 can be 105% of rated generator voltage and $V_{min}$ 244 can be 95% of rated generator voltage. Alternate limits can also be used.

In the illustrated embodiment of FIG. 2, $V_{command}$ 250 is compared to a signal 255 indicating measured terminal voltage for the generator. The difference between $V_{command}$ 250 and measured terminal voltage 255 is a voltage error signal 260 ($V_{Error}$), which is reduced by the voltage regulator 270 to cause the measured voltage to follow the voltage command.

Based on voltage error signal 260 ($V_{Error}$), the voltage regulator 270 generates reactive current command 280 ($I_{rq\ Cmd}$), which is used to control generator current. In one embodiment, Voltage regulator 270 is a PI controller that has a closed-loop time constant of approximately 50 milliseconds. Other types of controllers can also be used, for example, PD controllers, PID controllers, etc. Other time constants can be used (e.g., 1 second, 20 milliseconds, 75 milliseconds, 45 milliseconds) for voltage regulator 270.

In general, there are two components of a generator current command. They are the real power component denoted as $I_{d\ Cmd}$ and the reactive power component denoted as $I_{q\ Cmd}$. The current command 280 generated as described with respect to FIG. 2 is the reactive component ($I_{rq\ Cmd}$) of the current command. The real component or $I_{d\ Cmd}$ can be generated in any manner known in the art. Reactive current command 280 is limited to $I_{q\ max}$ 272 and $I_{q\ min}$ 274. The values for $I_{q\ max}$ 272 and $I_{q\ min}$ 274 can be based on generator current ratings. For example, $I_{q\ max}$ 272 can be set to a percentage of rated current for the generator and $I_{q\ min}$ 274 can be set to $-I_{q\ max}$. Alternate limits can also be used.

The current command 280 is transmitted to a controller of the wind turbine generator for generating real and reactive power based on the current commands. In one embodiment, all of the limits discussed with respect to FIG. 2 are non-windup limits; however, in alternate embodiments, a subset of the limits can be non-windup limits. The limits have been discussed in terms of fixed parameters; however, dynamically variable parameters provided by, for example, a lookup table or a processor or state machine executing a control algorithm can provide the limits. Such a dynamically variable limit may be based upon a current rating of the generator and a contemporaneous real power output.

Figure 3:
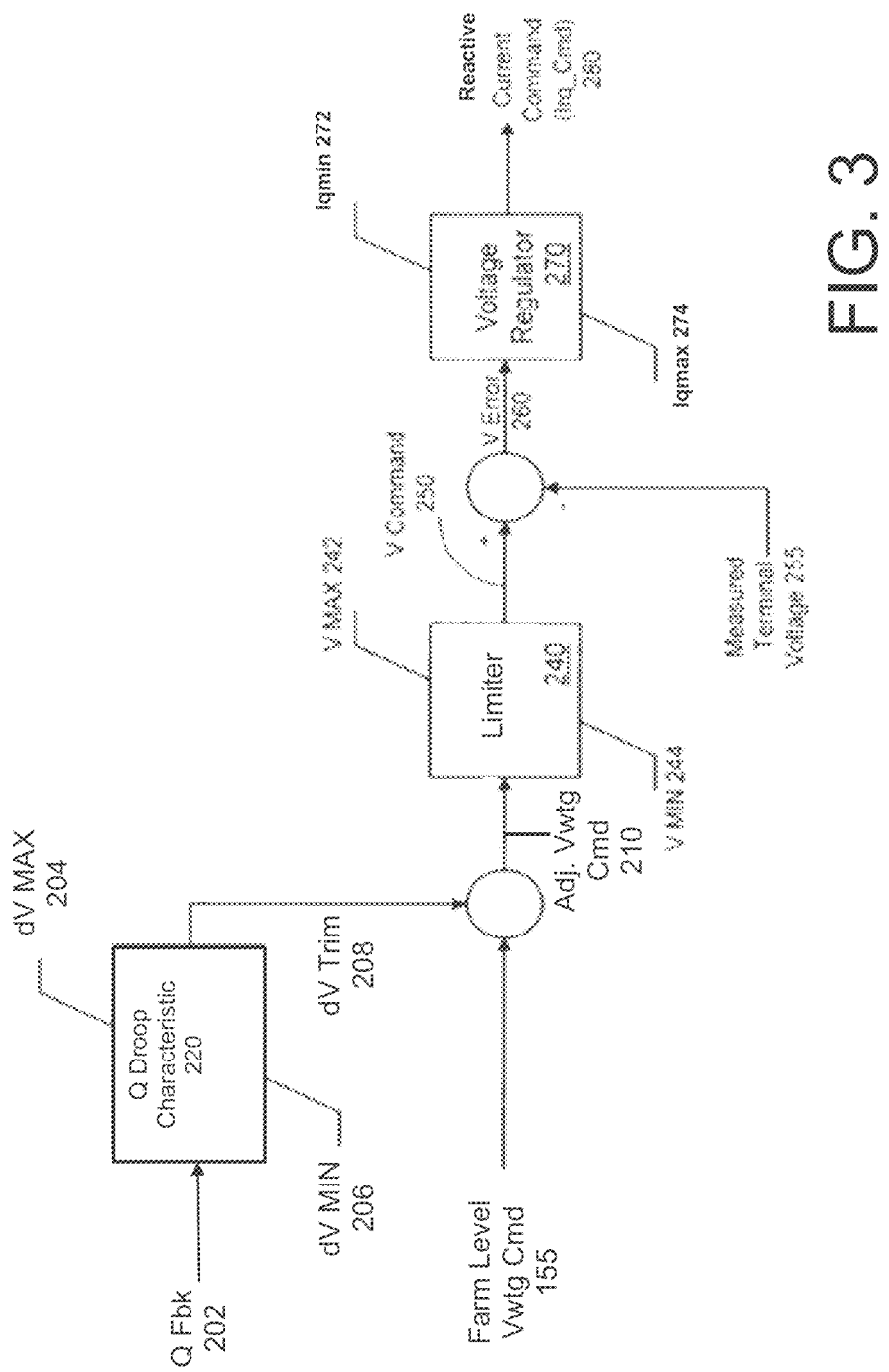
FIG. 3 is a control diagram of an alternate embodiment of a wind turbine generator control system.

As mentioned, in certain applications it may be desired to apply a bias or trim value to the voltage command signal $V_{command}$ 250 to achieve a reasonable balance of reactive power between the wind turbine generators, for example when collector impedance introduces imbalances in current flows between the wind turbine generators. In this regard, FIG. 3 depicts an embodiment of the system wherein the farm-level voltage command signal $V_{wtg\ cmd}$ 155 is adjusted as a function of a local reactive power droop characteristic for the wind turbine generator. This droop characteristic is preset, and may vary between the different wind turbine generators within a wind farm. For example, a preset 4% droop characteristic will provide a particular reactive current value at the generator's operating voltage, as compared to a 6% droop characteristic preset for a different wind turbine generator. The droop characteristic may be determined for the various wind turbines based on the impedance between that wind turbine and the wind farm substation bus. The use of the term "droop" in this context is the same as known in the art to cause sharing of reactive power among various sources of reactive power on an alternating current (ac) power system.

Still referring to FIG. 3, a bias or "delta voltage trim value" signal ($dV_{trim}$) 208 is generated as function of the reactive power droop characteristic and a measured reactive power feedback ($Q_{Fbk}$) signal 202 indicative of the individual wind turbine's actual reactive power output. The signal $dV_{trim}$ 208 is added to the farm-level voltage command signal $V_{wtg\ cmd}$ 155 to yield an adjusted command voltage signal ($V_{Adj\ cmd}$) 210, which is essentially the setpoint voltage for downstream voltage regulator 270. The signal $dV_{trim}$ 208 is maintained with set limits $dV_{max}$ 204 and $dV_{min}$ 206.

The adjusted command voltage signal $V_{Adj\ cmd}$ 210 is transmitted to the limiter circuit 240, which serves to maintain the signal value within defined limits and generate a set point voltage command signal $V_{command}$ 250. The remaining functionalities of the system of FIG. 3 are essentially the same as discussed above with respect to the system of FIG. 2.

Figure 4:
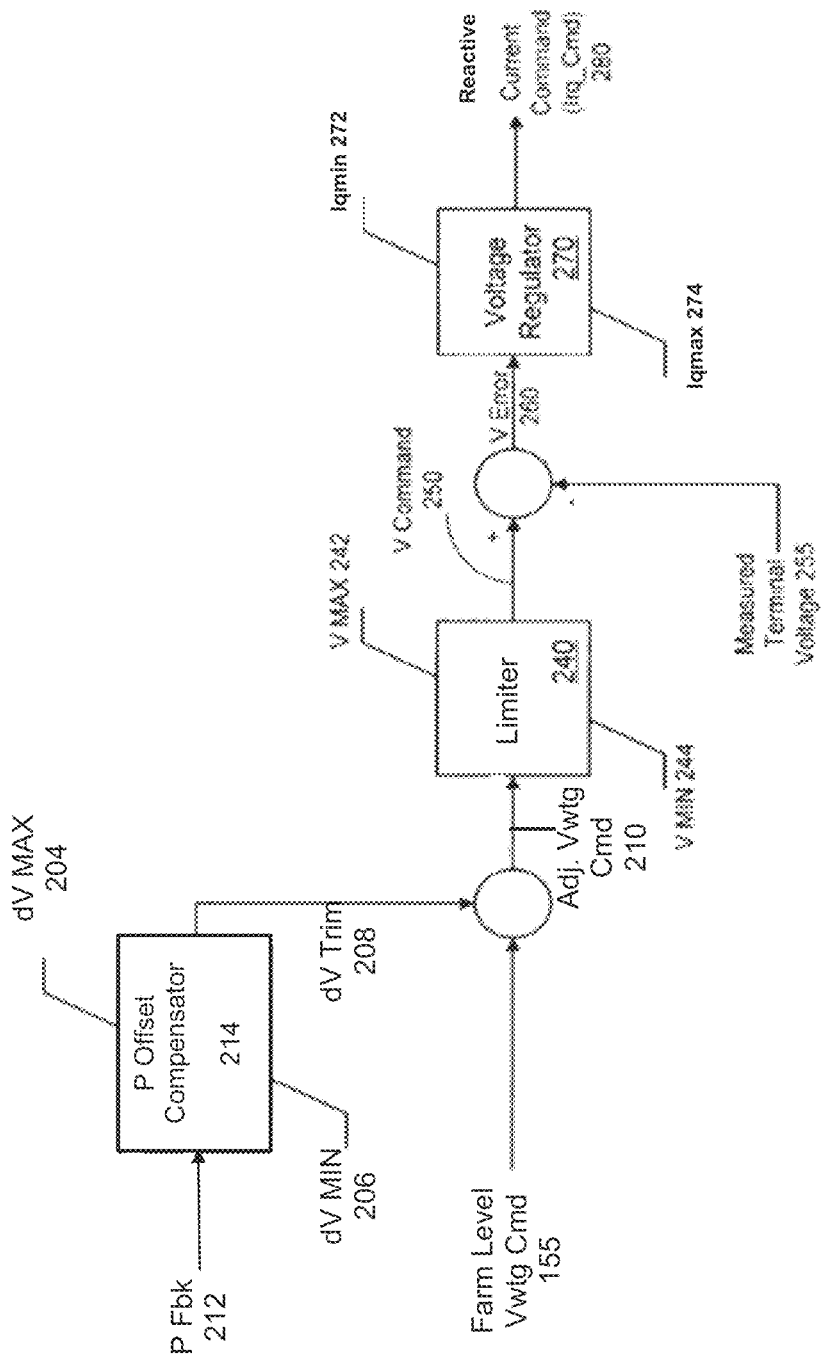
FIG. 4 is a control diagram of another embodiment of a wind turbine generator control system.

FIG. 4 depicts an alternate embodiment wherein the farm-level voltage command signal $V_{wtg\ cmd}$ 155 is adjusted to achieve a balance of reactive power between the wind turbine generators. In this embodiment, the voltage command signal $V_{wtg\ cmd}$ 155 is adjusted as a function of a real power offset value that is assigned to the wind turbine based upon, for example, location of the wind turbine within a wind farm. The real power offset value is preset and applied by a compensator 214 and, as mentioned, may vary between the different wind turbine generators based on respective location within a wind farm. With this embodiment, a voltage trim signal $dV_{trim}$ 208 may be generated as a function of the real power offset value and a measured real power feedback signal ($P_{Fbk}$) signal 212 from the wind turbine generator, with the voltage trim signal $dV_{trim}$ 208 applied to the farm-level voltage command signal $V_{wtg\ cmd}$ 155 to generate an adjusted voltage command signal $V_{Adj\ cmd}$ 210. As with the embodiment of FIG. 3, the adjusted command voltage signal $V_{Adj\ cmd}$ 210 is transmitted to the limiter circuit 240, which serves to maintain the signal value within defined limits and generate a set point voltage command signal $V_{command}$ 250. The remaining functionalities of the system of FIG. 4 are essentially the same as discussed above with respect to the system of FIGS. 2 and 3.

The real power offset value used in the system of FIG. 4 may be based on the resistance component of impedance between the particular wind turbine and the substation. For example, if the resistive portion of voltage difference between the wind turbine and the substation is 2% then that turbine would use as a parameter in the real power offset calculation of 2%. So at rated power, the real power offset would be 2%. The real power offset would vary in proportion to the value of real power measured at that turbine.

Figure 5:
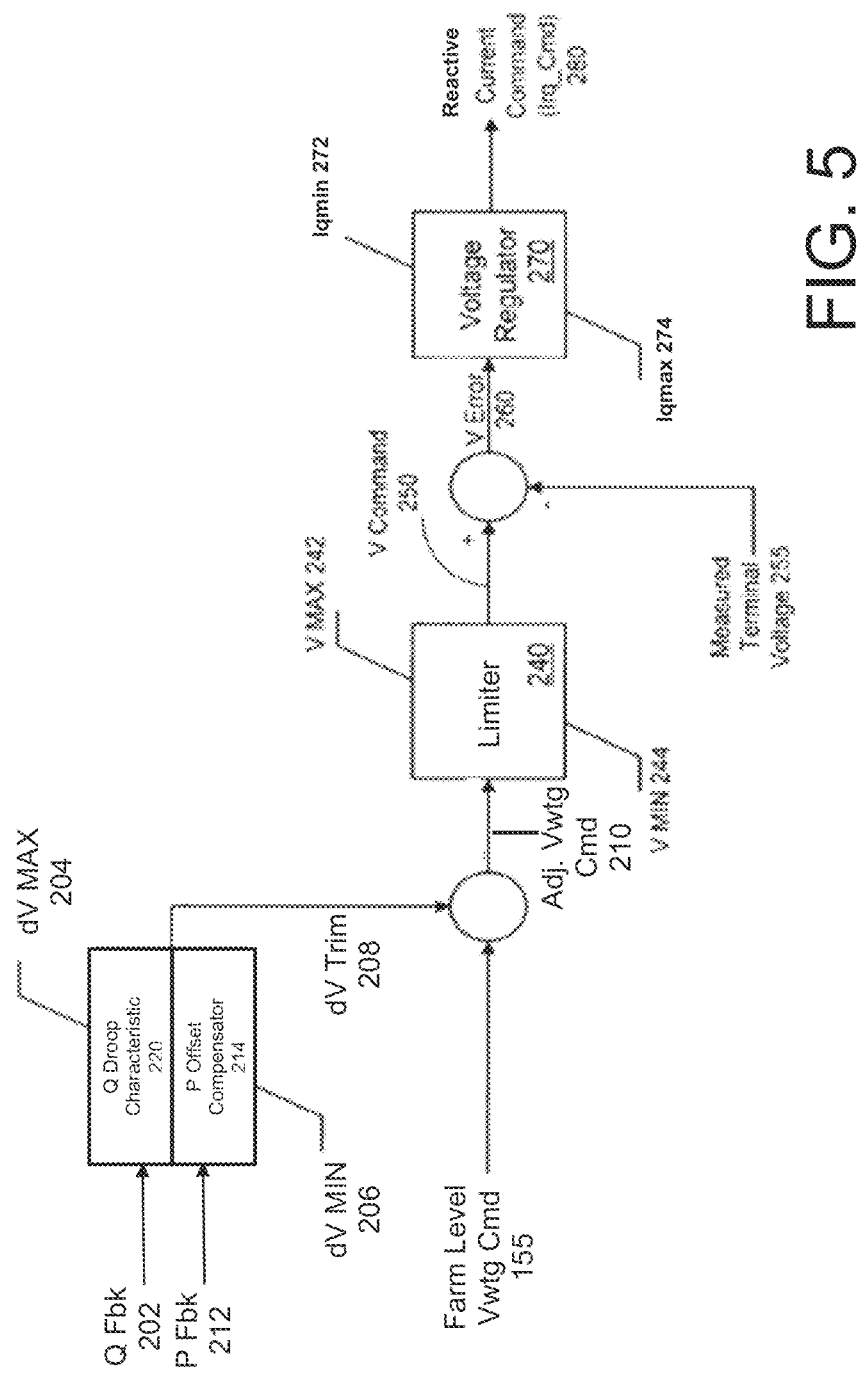
FIG. 5 is a control diagram of still a different embodiment of a wind turbine generator control system in accordance with aspects of the invention.

FIG. 5 depicts an embodiment wherein the farm-level voltage command signal $V_{wtg\ cmd}$ 155 is adjusted by a combination of a real power offset value as discussed above with respect to FIG. 4, and a reactive power droop characteristic as discussed above with respect to FIG. 3. The resulting bias or trim value $dV_{trim}$ 208 applied to the farm-level voltage command signal $V_{wtg\_cmd}$ 155 to generate the adjusted voltage command signal $V_{Adj\_cmd}$ 210 may be an additive result from the two different types of compensation, or any other result from the different compensations.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. In addition, while the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for reactive power generation for a wind turbine generator within a wind farm, comprising:
    receiving, from a field-level controller, a field-level voltage command signal, the field-level voltage command determined as a function of a power output of the wind farm and a voltage at a point of common coupling of a plurality of wind turbine generators;
    determining a generator-level voltage command for the wind turbine generator by adjusting the field-level voltage command signal as a function of a local reactive power droop characteristic for the wind turbine generator;
    determining a reactive current command for the wind turbine generator in response to the generator-level voltage command;
    transmitting the reactive current command to a controller of the wind turbine generator; and
    generating, via the controller of the wind turbine generator, a reactive power of the wind turbine generator based on the reactive current command that is determined in response to the field-level voltage command signal.

2. The method as in claim 1, wherein the generator-level voltage command signal is limited to a range of upper and lower limits based on generator terminal voltage, and the reactive current command is limited to a range based on a current rating of the wind turbine generator.

3. The method as in claim 2, wherein the generator-level voltage command signal is compared to a measured terminal voltage of the wind turbine generator to generate an error voltage signal transmitted to a voltage regulator.

4. The method as in claim 1, wherein the field-level voltage command signal is applicable to all or a subset of wind turbines within the wind farm.

5. The method as in claim 1, wherein the droop characteristic is preset and varies for different wind turbine generators within the wind farm or substation.

6. The method as in claim 1, comprising generating a voltage trim signal as a function of the reactive power droop characteristic and a measured reactive power feedback signal from the wind turbine generator, and applying the voltage trim signal to the field-level voltage command signal to generate the generator-level voltage command signal.

7. The method as in claim 1, further comprising adjusting the field-level voltage command signal as a function of a real power offset value for the wind turbine.

8. The method as in claim 7, wherein the real power offset value is preset and varies for different wind turbine generators within wind farm or substation.

9. The method as in claim 7, comprising generating a voltage trim signal as a function of the real power offset value and a measured real power feedback signal from the wind turbine generator, and applying the voltage trim signal to the field-level voltage command signal to generate the generator-level voltage command signal.

10. The method as in claim 1, further comprising adjusting the field-level voltage command signal as a combined function of a local reactive power droop characteristic and real power offset value for the wind turbine generator.

11. The method as in claim 10, wherein either or both of the droop characteristic and real power offset value varies for different wind turbine generators within the wind farm or substation.

12. The method as in claim 10, comprising generating a voltage trim signal as a function of the combination of the reactive power droop characteristic applied to a measured reactive power feedback signal for the wind turbine generator, and the real power offset value applied to a measured real power feedback signal for the wind turbine generator, and applying the voltage trim signal to the field-level voltage command signal to generate the generator-level voltage command signal.

13. A method for reactive power generation for a wind turbine generator, within a wind farm, comprising:
    receiving a field-level voltage command for a wind turbine generator from a field-level controller, the field-level voltage command determined as a function of a power output of the wind farm and a voltage at a point of common coupling of a plurality of wind turbine generators;
    receiving a feedback reactive power signal for the individual wind turbine;
    applying a local reactive power droop characteristic for the wind turbine generator to the feedback reactive power signal to generate a voltage trim value;
    limiting the voltage trim value to a predetermined voltage range;
    applying the voltage trim value to the field-level voltage command to generate an adjusted voltage command;
    limiting the adjusted voltage command to a predetermined voltage range;
    generating a voltage error signal based on a measured voltage of the wind turbine generator and the adjusted voltage command;
    generating a reactive current command based on the voltage error signal, and limiting the reactive current command to a predetermined current range; and
    generating a reactive power of the wind turbine generator based on the reactive current command that is based on the voltage command received from the field-level controller.

14. A method for reactive power generation for a wind turbine generator, within a wind farm, comprising:
    receiving a field-level voltage command for a wind turbine generator from a field-level controller, the field-level voltage command determined as a function of a power output of the wind farm and a voltage at a point of common coupling of a plurality of wind turbine generators;

receiving a feedback real power signal for the individual wind turbine;

applying a real power offset value to the feedback real power signal to generate a voltage trim value;

limiting the voltage trim value to a predetermined voltage range;

applying the voltage trim value to the field-level voltage command to generate an adjusted generator level voltage command;

limiting the adjusted generator level voltage command to a predetermined voltage range;

generating a voltage error signal based on a measured voltage of the wind turbine generator and the adjusted generator level voltage command;

generating a reactive current command based on the voltage error signal, and limiting the reactive current command to a predetermined current range; and generating a reactive power of the wind turbine generator based on the reactive current command that is based on the field-level voltage command received from the field-level controller.

* * * * *